(12) United States Patent
Ostholt et al.

(10) Patent No.: US 12,421,167 B2
(45) Date of Patent: Sep. 23, 2025

(54) SUBSTRATE MADE OF GLASS AND METHOD FOR THE PRODUCTION THEREOF

(71) Applicant: LPKF Laser & Electronics SE, Garbsen (DE)

(72) Inventors: Roman Ostholt, Langenhagen (DE); Norbert Ambrosius, Garbsen (DE); Daniel Dunker, Hannover (DE); Aaron Michael Vogt, Hannover (DE); Sergej Schneider, Hannover (DE)

(73) Assignee: LPKF LASER & ELECTRONICS SE, Garbsen (DE)

( * ) Notice: Subject to any disclaimer, the term of this patent is extended or adjusted under 35 U.S.C. 154(b) by 296 days.

(21) Appl. No.: 18/007,050

(22) PCT Filed: May 20, 2021

(86) PCT No.: PCT/EP2021/063533
§ 371 (c)(1),
(2) Date: Jan. 27, 2023

(87) PCT Pub. No.: WO2022/022873
PCT Pub. Date: Feb. 3, 2022

(65) Prior Publication Data
US 2023/0278917 A1   Sep. 7, 2023

(30) Foreign Application Priority Data
Jul. 28, 2020 (DE) ............ 10 2020 119 929.5

(51) Int. Cl.
*C03C 23/00* (2006.01)
*C03C 15/00* (2006.01)
*C03C 17/32* (2006.01)

(52) U.S. Cl.
CPC .......... *C03C 23/0025* (2013.01); *C03C 15/00* (2013.01); *C03C 17/32* (2013.01); *C03C 2218/31* (2013.01)

(58) Field of Classification Search
CPC ........................... C03C 23/0025; C03C 15/00
(Continued)

(56) References Cited

U.S. PATENT DOCUMENTS

2016/0057834 A1   2/2016  Lin et al.
2017/0294495 A1*  10/2017 Shyu ................. H10K 50/8423

FOREIGN PATENT DOCUMENTS

DE    102014113339 A1    3/2016
EP    2709091 B1          2/2019
(Continued)

*Primary Examiner* — Tahseen Khan
(74) *Attorney, Agent, or Firm* — Leydig, Voit & Mayer, Ltd.

(57) ABSTRACT

A substrate made of glass includes an essentially dimensionally stable portion, one or more flexible portions, and one or more recesses on one side or which do not penetrate the substrate, and which is/are disposed in an outer surface of the substrate, so as to reduce a material thickness of the substrate in the flexible portion relative to an adjacent portion. The recess is formed in each case by a plurality of concave depressions that are defined by microstructures, a course of which determines a remaining material thickness of the substrate in the flexible portion. The depressions extend at least in portions into an area having a thickness parallel to the outer surface which on bending the substrate encloses a plane of a neutral axis between an extension zone and a compression zone of the substrate.

20 Claims, 5 Drawing Sheets

(58) Field of Classification Search
USPC .......................................................... 428/156
See application file for complete search history.

(56) References Cited

FOREIGN PATENT DOCUMENTS

| | | |
|---|---|---|
| EP | 3206108 B1 | 3/2019 |
| EP | 3456036 B1 | 8/2020 |
| JP | 2013009016 A | 1/2013 |
| WO | WO 2015116466 A1 | 8/2015 |

* cited by examiner

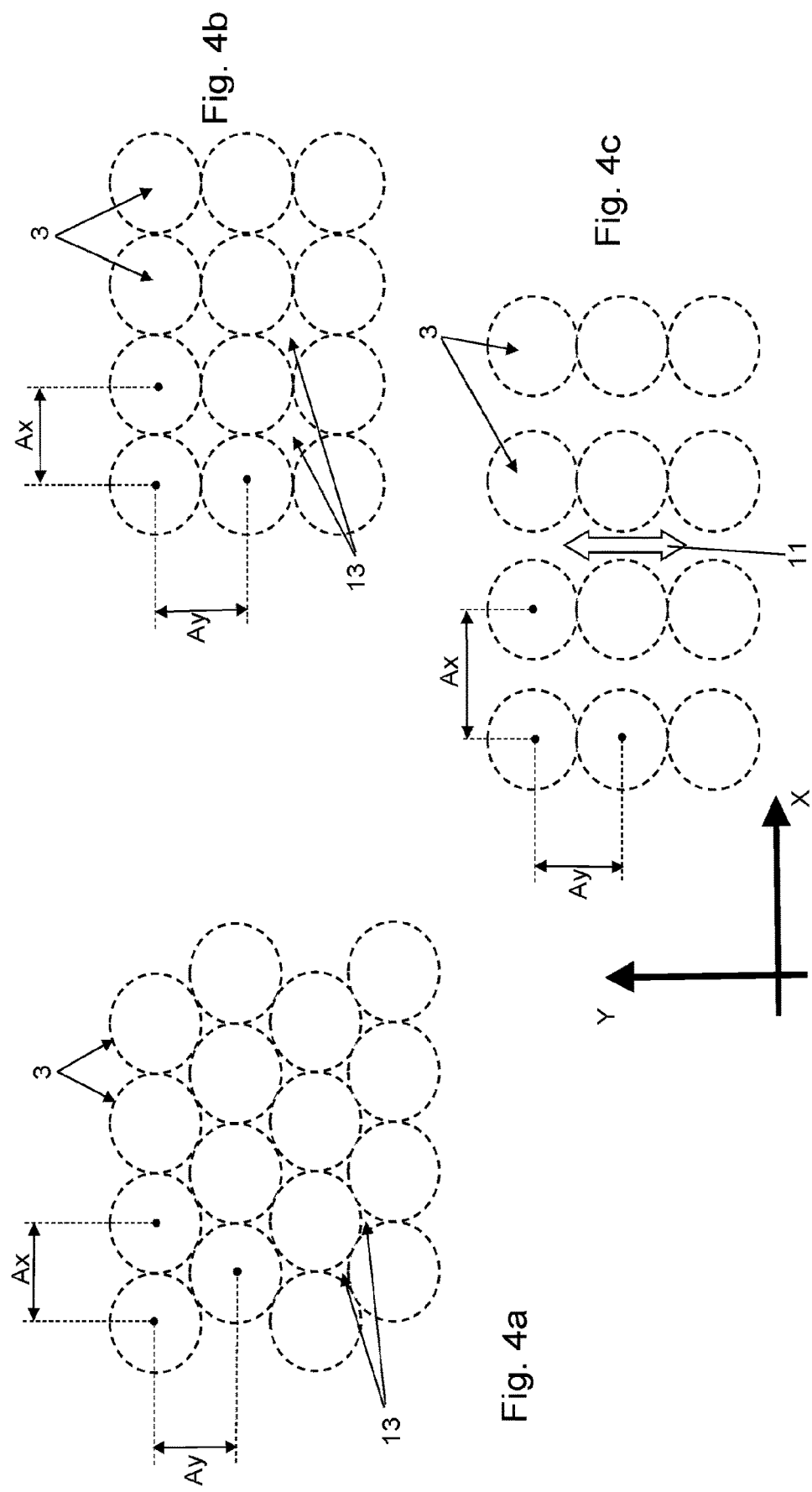

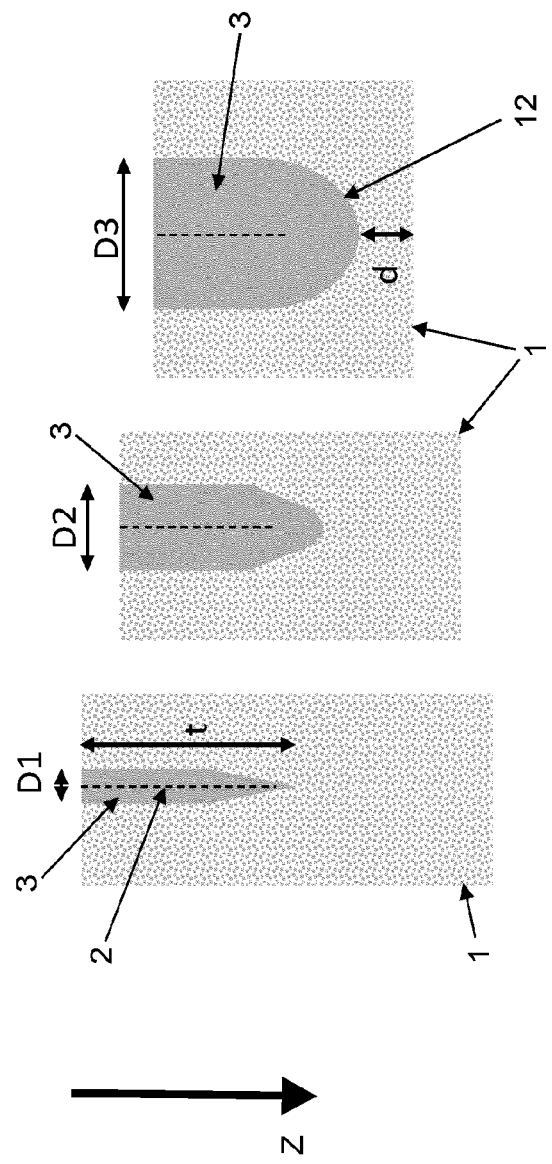

SUBSTRATE MADE OF GLASS AND METHOD FOR THE PRODUCTION THEREOF

CROSS REFERENCE TO RELATED APPLICATIONS

This application is a U.S. National Phase application under 35 U.S.C. § 371 of International Application No. PCT/EP2021/063533, filed on May 20, 2021, and claims benefit to German Patent Application No. DE 10 2020 119 929.5, filed on Jul. 28, 2020. The International Application was published in German on Feb. 3, 2022 as WO 2022/022873 A1 under PCT Article 21(2).

FIELD

The invention relates to a substrate made of glass that exhibits at least one essentially dimensionally stable portion and at least one flexible portion, and also a method for the production of the substrate.

BACKGROUND

Such substrates made from glass are increasingly used as displays, for example on the base of organic light emitting diodes (OLED) for display purposes, in particular in small devices such as mobile transportable appliances.

It is known to design OLED displays to be flexible. For this purpose, methods for subsequently structuring a flexible organic light emitting diode (FOLED) are known where one or more layers are stepwise ablated again by means of laser radiation (ablation) from the stacked layer arrangement.

Since they can be manufactured from layers of organic materials on flexible carrier substrates, including flexible driver circuits, they can be adapted to non-planar surfaces or incorporated in structures that by themselves exhibit flexible properties.

A problem is the sensitivity of OLED materials toward oxygen and/or humidity, resulting in relatively short lifespans. This can be solved for example in that the actual OLED components are introduced between two glass layers that are essentially free from oxygen and/or steam diffusion.

A further possibility is to use the OLED display on a glass substrate having a blocking layer. These blocking layers can be for example structured from silicon oxides ($SiO_2$), (boron) silicates, aluminates ($Al_2O_3$) or metal layers (Al, Ag, Au, Rh) or other corresponding materials.

Such OLED structures or devices remain flexible when the glass layers exhibit a thickness below certain limits. OLEDs having glass layers and a thickness of 100 µm or less typically still exhibit the required flexibility for most purposes.

However, such thin glass layers, i.e. below 50 µm, or even below 20 µm, are fragile and tend to break on account of their brittleness. Seen from this angle, it is therefore desirable to connect such OLEDs to mechanically rigid (flexible or non-flexible) carrier substrates for stabilizing purposes.

When producing classical displays for smartphones, a carrier substrate from glass is used as the lowest layer, the so-called "back plane". The properties of technical glasses are ideal for the requirements of a back plane.

The development of foldable displays for novel smart phones was accompanied by a significant change of the process sequence. In the current approach after the components have been mounted the back planes made of glass which were originally intended for stabilizing and fixating the electronic components have to be removed in a laborious method (laser lift-off method) that increases the reject rate. In this way, only the flexible components of the display remain without the protective back plane.

The laser lift-off method is about transferring a microelectronic functional layer onto a new carrier substrate that is lighter and thinner. In most cases, the separation of the layers takes place here by selective laser ablation and evaporation of a strongly absorbing intermediate layer, typically a polymer layer. It is decisive not to impair the adjacent microelectronic functional layer by means of the energy of the laser radiation.

The production of flexible displays, whether they are being used in a smartphone, tablet or e-reader, always have one thing in common: The circuit layers for individually controlling pixels are no longer located on a rigid glass carrier but on a flexible layer.

Among the disadvantages of the conventional laser lift-off method are the long process times/high production costs and the reject that additionally arises as a result of the method since in this method the displays can be damaged.

Such flexible display devices are known for example from EP 3 206 108 B1, EP 3 456 036 A1 or EP 2 709 091 B1.

US 2016/0 057 834 A1 further refers to a method for the production of a substrate for a display module. A substrate body with a signal circuit area is applied onto a transparent carrier plate. A multiplicity of openings is introduced into the substrate body and a lower surface is etched through the transparent carrier plate by high-energy light so as to separate the substrate body from the transparent carrier plate.

JP 2013-009 016 A refers to a multiplicity of thin-film elements on a semiconductor layer where an etch groove is introduced by laser etching between a multiplicity of thin-film elements.

SUMMARY

In an embodiment, the present invention provides a substrate made of glass. The substrate includes an essentially dimensionally stable portion, at least one flexible portion, and at least one recess that is on one side or does not penetrate the substrate, and that is disposed in an outer surface of the substrate, so as to reduce a material thickness of the substrate in the at least one flexible portion relative to an adjacent portion. The at least one recess is formed by a plurality of concave depressions that are defined by microstructures, a course of which determines a remaining material thickness of the substrate in the at least one flexible portion. The depressions extend at least in portions into an area having a thickness parallel to the outer surface which on bending the substrate encloses a plane of a neutral axis between an extension zone and a compression zone of the substrate.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIGS. 4*a*-4*c* show schematic distributions of the depressions in the substrate in a top view; and FIG. 5 shows the sequence of rounding the modification during etching in different stages.

DETAILED DESCRIPTION

Figure 1:
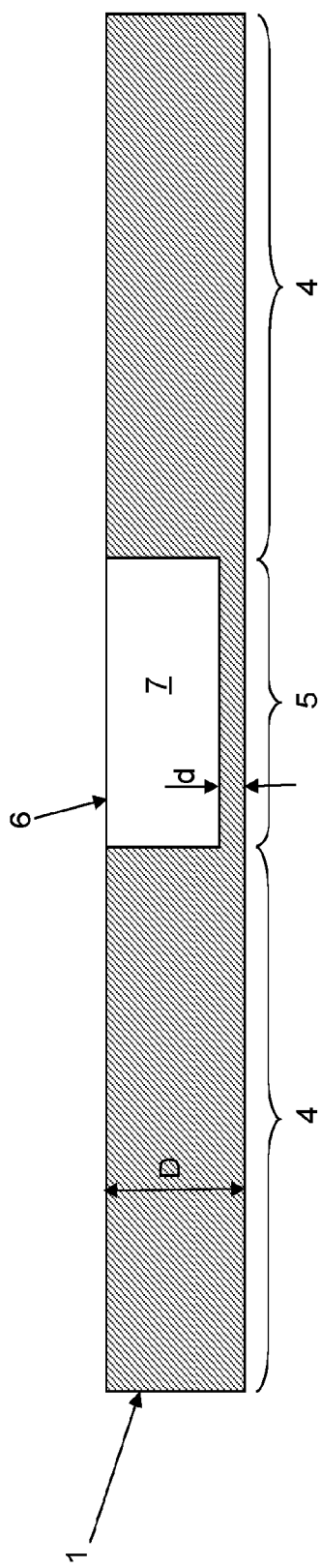
FIG. 1 shows a cross-sectional view of a substrate made of glass.

In an embodiment, the present invention provides a carrier substrate for a display that exhibits significantly improved flexible properties and at the same time fulfills high requirements on the load-bearing capacity of the glass surface, for example in the shape of a so-called pen-drop test.

According to an embodiment of the present invention, the foldable substrate from glass exhibits the following properties in particular for display applications:
1. Introduce on one side non-continuous structures so as to reduce the glass thickness 4 foldable and mechanically highly stable (shown by means of the pen-drop test)
2. At least two areas having different thicknesses
3. Thickness in the area of the hinge <100 µm, preferably <50 µm, preferably <30 µm
4. Filled with polymer
5. The bottom is formed by spherical depressions
6. Depressions can be arranged differently, e.g. tight sphere pack (for example hexagonal arrangement) or square arrangement
7. Fulfills the pen-drop test (in comparison to an area that is simply only thin)
8. Several areas can exhibit various glass thicknesses, also original thickness An embodiment of the present invention relates to a device made of glass with at least two areas:
At least one area is non-foldable
At least one area is foldable
The foldable area exhibits microstructures on one side
Microstructures exhibit concave areas with a smooth course below the centerline
Microstructures exhibit convex areas with a non-smooth course above the centerline The method for the production of a substrate 1 made of glass is based on generating linear modifications 2 having an extent in the z-direction and a residual thickness d of the substrate 1, as can be gathered from FIG. 5, and a defined spacing in the x- and y-direction, as is shown in FIG. 4. Each modification 2 ends in the volume of the substrate 1 with a modification depth t. As soon as modified glass of the substrate 1 was removed by wet etching, the etching process is isotropic in the remaining substrate 1. A depression 3 having a spacing from the opposite surface of the substrate 1 and a residual thickness d results, the reaching of which at the same time defines the entire etching duration.

As is illustrated in FIG. 1, the substrate 1 that is illustrated here as an example consists of an essentially dimensionally stable portion 4 and at least one flexible, in particular bendable, elastic and/or foldable portion 5, there being introduced at least in the flexible portion 5 a recess 6 that is on one side or at least does not penetrate the substrate 1 through a multiplicity of depressions 3 as microstructures 12 into an outer surface of the substrate 1 and as a result the material thickness D of the substrate 1 is reduced to the residual thickness d in the flexible portion 5 opposite the adjacent portion 4. The recess 6 is filled with a polymer 7 that can for example exhibit similar optical properties as the glass material of the substrate 1.

Here the recess 6 is formed by several or a multiplicity of depressions 3 in the remaining substrate material and limited by the multiplicity of regularly arranged, concave microstructures 12 whose shape at the same time determines the remaining material thickness as a residual thickness d of the substrate 1 in the flexible portion 5. The depressions 3 extend with their minimum up to maximum depth in an area of the substrate 1 having a thickness S parallel to the outer face that encloses the plane of a neutral axis 8 between an extension zone 9 and compression zone 10 of the substrate 1 when bending the substrate 1 on account of an outer force impact F.

The following aspects, alone and in different combinations, form embodiments of the invention:
Foldable or flexible portion 5 having depressions 3 that are limited by periodically arranged microstructures 12
Periodically arranged microstructures 12 in each case exhibit a center in which the glass thickness or the residual thickness d is smallest
Periodically arranged microstructures 12 can be arranged in a rectangle
Rectangular arrangement exhibits along the folding direction 11 a spacing Ax that is bigger by at least 20% of the centers of the microstructures 12 than the spacing Ay of the centers of the microstructures 12 at right angles relative to the folding direction 11
Depressions 3 are filled with polymer 7
Polymer 7 exhibits approximately the same index of refraction in the visible spectrum as the glass material of the substrate 1
Polymer 7 is flexible
Substrate 1 including polymer filling passes the pen-drop test in the foldable area
A transition area can be produced between the dimensionally stable portion 4 and the flexible portion 5 that exhibits a continually decreasing glass thickness having a steadily decreasing residual thickness d, wherein the following conditions shall apply:
"foldable": bending radius <20 cm
"above": on the side facing away from the glass
"below": on the side facing the glass
"concave": curved in the direction of the glass
"convex": curved opposite to the concave curve
"centerline": imaginary line that has the same spacing from the top and lowest points of the microstructures in the glass
"pen-drop test": A ballpoint pen (BIC easy glide, weight 5.73 g) falls from a height of 20 cm with the tip ahead (from tungsten carbide having a diameter of 0.7 mm) onto a workpiece and a fracture of the workpiece is determined
"glass": material having a proportion of glass, also includes glass ceramic
"x-direction": alongside the surface of the glass body at right angles relative to the folding direction
"y-direction": alongside the surface of the glass body, parallel to the folding direction
"z-direction": at right angles to x and y.

The microstructures 12, that limit the concave depressions 3 at the bottom of the depressions 3, provide for mechanical stability in the area of the small glass thickness; similar to a Gothic church roof, the interfaces of the microstructures 12 on the side facing the remaining glass material of the substrate 1 exhibit only rounded concave structures. Peaks are avoided whereby the mechanical stability of the thin area or of the thin areas is larger than in the case of completely smooth bottom surfaces.

This was shown by the pen-drop test: This test is particularly important and practical for glasses that are used for displays. A pen falls with the tip ahead onto the glass. If the glass breaks, it is not stable enough for display applications. This happens with a flat thin glass. If inventive structures are introduced that fulfill the abovementioned features the glass passes the pen-drop test despite the thickness of the glass not being increased.

Figure 3:
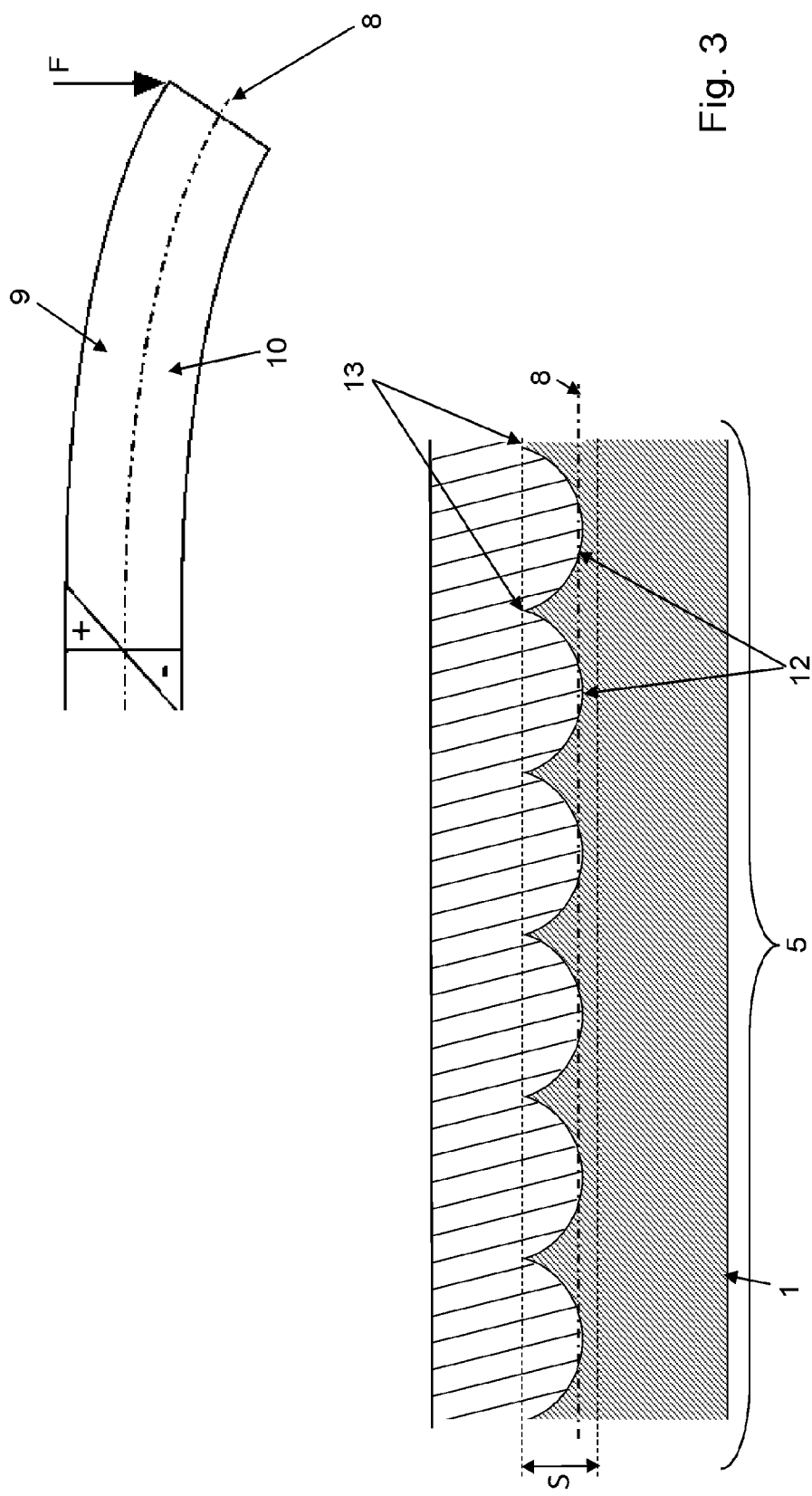
FIG. 3 shows an enlarged cross-sectional view of the substrate.

As can be seen in FIG. 3, the thickness of the polymer 7 and of the substrate 1 is selected such that the neutral axis 8 is located in the area of the concave microstructures 12, as closely as possible to the spherical bottom. The neutral axis 8 ideally coincides with the bottom surface.

Figure 2:
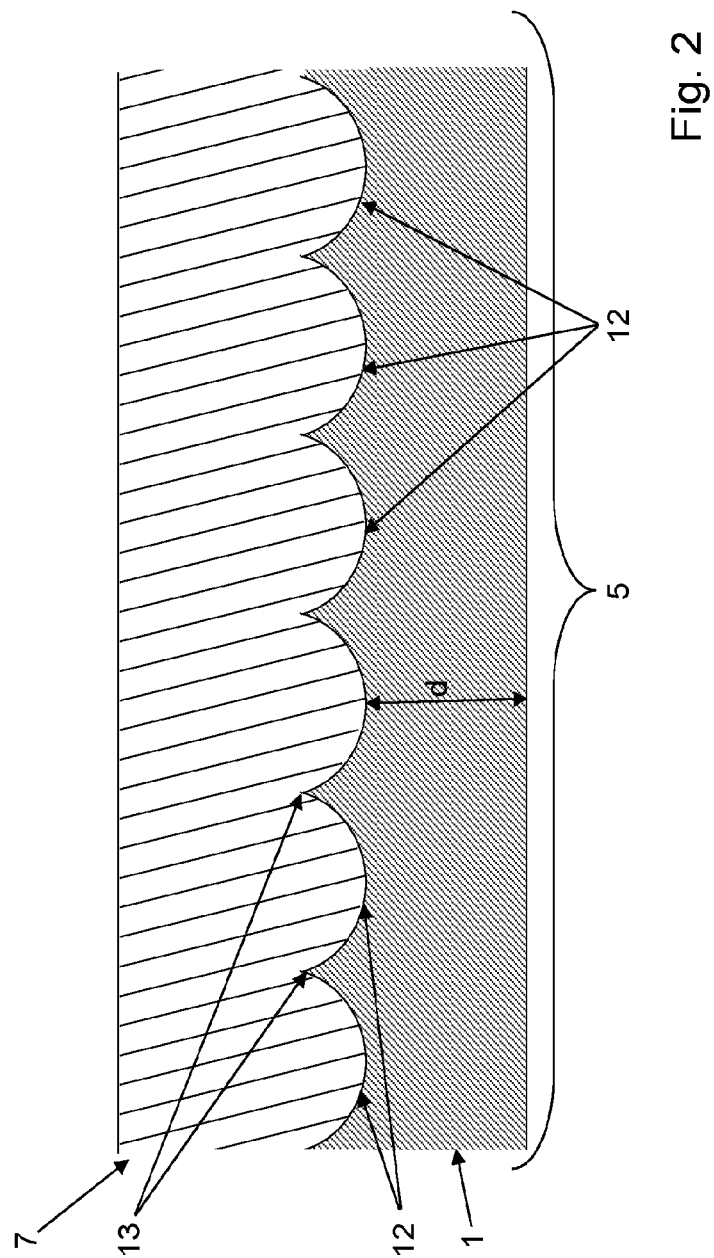
FIG. 2 shows an enlarged cross-sectional view of the substrate.

A corresponding design of the depressions 3 in the flexible portion 5 is shown in FIGS. 2 and 3. The spherical shapes of the microstructures 12 result in protruding intermediate areas 13 that taper to a point between the depressions 3 that are pointing as filling material only in the direction of the polymer 7. The delimiting surface of the microstructures 12 exhibits in the direction of the remaining glass material of the substrate 1 exclusively smooth, rounded structures. This boundary face that is formed from a multiplicity of mutually adjacent spherical or spheroidal surface portions results in a high load-bearing capacity despite the reduced residual thickness d and a flexibility in the direction of the filling of the polymer 7.

In this case, as is shown in FIG. 3, the ratio of the depressions 3 that are filled with the polymer 7 and of the residual thickness d of the glass substrate is selected by means of the modification depth t in such a manner that the neutral axis 8 comes to lie in the area of the concave microstructures 12, preferably toward the spherical bottom at the center of the microstructures 12 with the lowest residual thickness dmin. In the ideal case, the neutral axis 8 coincides with the plane determined by the lowest residual thickness dmin.

FIG. 4 shows possible arrangements or distributions of the depressions 3 in the substrate 1. The hexagonal arrangement illustrated in FIG. 4a or the tight sphere pack, in which the lowest point of a spherical depression 3 comes to lie at the center of the depression 3 and in which the peaks facing the polymer filling or the intermediate areas 13 tapering to a point between the depressions 3 are minimized, results in advantages for the torsion in different directions since the tension is distributed largely homogenously across the face.

While FIG. 4b shows a square arrangement having coinciding spacings toward all adjacent depressions 3 and correspondingly homogenously flexible properties, FIG. 4c shows as an example an advantageous arrangement for folds in the horizontal direction with different spacings Ax in the x-direction and Ay in the y-direction corresponding to the folding direction 11.

As soon as the modification depth t is reached, as is illustrated in FIG. 5, the etching progress in the substrate 1 progresses essentially isotropically, which increasingly leads to a rounding of the resulting depression 3 in the area of the point at the end of the modification 2. During etching, the substrate 1 is in particular becoming thinner and the diameter D1 to D3 of the depressions 3 is becoming bigger. The rounding is thus achieved by "overetching".

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

| LIST OF REFERENCE CHARACTERS | | | |
|---|---|---|---|
| 1 | Substrate | t | Modification depth |
| 2 | Modification | d | Residual thickness |
| 3 | Depression | D | Material thickness |
| 4 | Portion | S | Thickness |
| 5 | Portion | F | Force impact |
| 6 | Recess | Ax | Spacing |
| 7 | Polymer | Ay | Spacing |
| 8 | Neutral axis | D1 | Diameter |
| 9 | Extension zone | D2 | Diameter |
| 10 | Compression zone | D3 | Diameter |
| 11 | Folding direction | | |
| 12 | Microstructure | | |
| 13 | Intermediate area | | |

The invention claimed is:

1. A substrate made of glass, the substrate comprising:
an essentially dimensionally stable portion;
at least one flexible portion; and
at least one recess that is on one side or does not penetrate the substrate, and that is disposed in an outer surface of the substrate, so as to reduce a material thickness of the substrate in the at least one flexible portion relative to an adjacent portion, the at least one recess being formed by a plurality of contiguous concave depressions that are defined by microstructures, a course of which determines a remaining material thickness of the substrate in the at least one flexible portion,
wherein the depressions extend at least in portions into an area having a thickness parallel to the outer surface which on bending the substrate encloses a plane of a neutral axis between an extension zone and a compression zone of the substrate.

2. The substrate according to claim 1, wherein the plane of the neutral axis subdivides the area into a first part area facing away from the outer surface in which the depressions are free of discontinuity points, and a second part area in which the depressions exhibit a continuous and/or non-continuous course.

3. The substrate according to claim 1, wherein the plane of the neutral axis runs between a floor of the depressions and an edge area between adjacent ones of the depressions.

4. The substrate according to claim 1, wherein the plane of a neutral axis runs exclusively through an area of the depressions, in which the depressions are free of discontinuity points.

5. The substrate according to claim 1, wherein the at least one recess includes a polymeric filling material having a filling height corresponding to the adjacent portion.

6. The substrate according to claim 5, wherein the polymeric filling material has an index of refraction that coincides at least essentially with an index of refraction of the glass in the visible spectrum.

7. The substrate according to claim 5, wherein the polymeric filling material exhibits flexible and/or elastic material properties.

8. The substrate according to claim 1, wherein the depressions are formed by the microstructures that are at least portion-wise periodic or arranged in a regular pattern.

9. The substrate according to claim 1, wherein the depressions are arranged in a geometric right-angle pattern.

10. The substrate according to claim 1, wherein adjacent ones of the depressions have, in a direction of a bend or fold, a spacing that is at least 20% larger than in a transverse direction relative to the bend or fold.

11. The substrate according to claim 1, wherein the depressions in each case exhibit a center in which the remaining material thickness of the substrate in the flexible portion is lowest.

12. The substrate according to claim 1, wherein the depressions are rotationally symmetric.

13. The substrate according to claim 1, wherein the area into which the depressions extend is arranged in differing flexible portions having varying spacing to the outer surface and/or exhibit a different thickness.

14. The substrate according to claim 1, wherein in at least one adjacent flexible portion, the remaining material thickness of the substrate is produced by differing depressions.

15. The substrate according to claim 1, wherein the remaining material thickness in the at least one flexible portion is below 100 µm.

16. The substrate according to claim 1, wherein the depressions are arranged according to the principle of a tight sphere pack, a hexagonal or square arrangement in the at least one flexible portion.

17. The substrate according to claim 1, wherein the depressions are introduced according to the principle of a Gothic church roof.

18. A method for the production of the substrate made of glass according to claim 1, the method comprising:

introducing, into the at least one flexible portion by laser radiation, at least one modification with a defined modification depth into and up to the area parallel to the outer surface; and subjecting the at least one modification to a wet-chemical etching attack, by which material ablation takes place so as to introduce into the at least one flexible portion the at least one recess that is on one side or does not penetrate the substrate as the microstructures into the outer surface of the substrate such that the material thickness of the substrate is reduced in the at least one flexible portion by the material ablation, wherein the wet-chemical etching attack takes place until the depressions are produced as concave and extend at least over an essential part of the material thickness of the substrate up to and into the area, and wherein, in an area of the at least one modification, initially anisotropic material ablation is produced and subsequently the wet-chemical etching attack is continued until isotropic material ablation occurs and thereby an at least largely steady course of the depressions is produced.

19. The method according to claim 18, wherein the isotropic material ablation is continued until a spherical rounding of the depressions in the area occurs.

20. The method according to claim 18, wherein an etching solution used in the etching attack is set as a function of certain parameters of the substrate material such that a selective etching process of the wet-chemical etching attack and/or an etching rate that is as high as possible is achieved.

* * * * *